Sept. 18, 1951   D. J. McINTOSH ET AL   2,568,649
CHAIN STRUCTURE
Filed Dec. 24, 1947
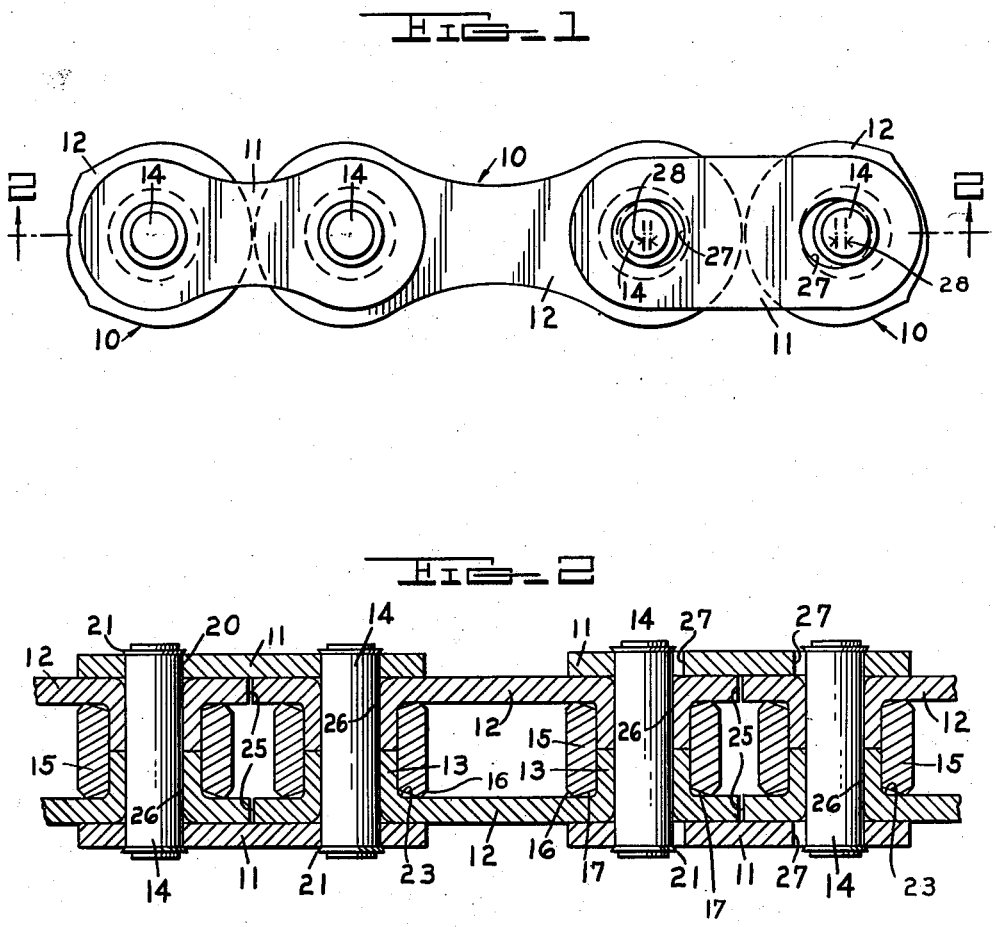
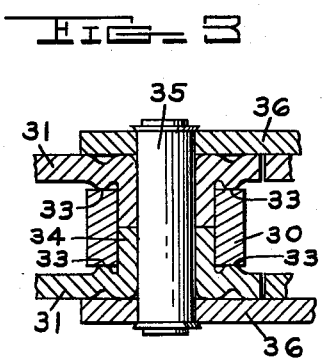
INVENTORS
DONALD J. McINTOSH
MITCHELL SMITH
BY
Whittemore, Hulbert
& Belknap
ATTORNEYS Patented Sept. 18, 1951

2,568,649

UNITED STATES PATENT OFFICE 2,568,649

CHAIN STRUCTURE

Donald J. McIntosh and Mitchell Smith, Detroit, Mich., assignor, by mesne assignments, to said Mitchell Smith, Detroit, Mich.

Application December 24, 1947, Serial No. 793,736

8 Claims. (Cl. 74—255)

The present invention relates to chain structure and more specifically to an improved sprocket chain.

It is an object of the present invention to provide a sprocket chain characterized by the simplification of the chain and the improved design contributing to the economy of manufacture and efficiency of the chain in operation.

It is a further object of the present invention to provide a sprocket chain in which link bars are provided with integrally formed tubular collars or sleeves adapted when assembled to form journal sleeves for the reception of pivot pins and rollers.

It is a further object of the present invention to provide an improved sprocket chain in which the component parts may be produced with the maximum economy.

It is a further object of the present invention to provide a sprocket chain composed of links formed by cooperating pairs of link bars, each of which is provided with laterally extending tubular sleeves or collars, the ends of which are adapted to abut, said tubes or collars forming sleeves about which is located a roller and through which extends a pin, adjacent links being connected by connecting link plates having openings at their ends for receiving the projecting ends of the pins.

Other objects and features of the invention will become apparent as the description proceeds, especially when taken in conjunction with the accompanying drawings, wherein:

Figure 1 is a side elevation of a portion of the improved sprocket chain;

Figure 2 is a longitudinal section taken substantially on the line 2—2, Figure 1; and Figure 3 is a fragmentary transverse section through the connection between a link and link bars illustrating a somewhat different embodiment of the present invention.

Referring now to the drawings, the chain comprises links 10, adjacent links being connected by pairs of connecting link plates 11.

Each of the links 10, as best seen in Figure 2, comprises identical link bars 12, each of which is provided adjacent its ends with laterally projecting tubular sleeves or collars 13. The ends of the tubular sleeves or collars 13 are adapted to abut in assembly to form a journal sleeve which receives the pivot pins 14. Around the journals formed by the tubular sleeves or collars 13 are provided rollers 15, the ends of which are chamfered as indicated at 16 and 17 so as to reduce the area of contact between the ends of the rollers and the inner surfaces of the link bars. While in Figure 2 the chamfers are shown as intersecting so as to provide substantially line contact between these surfaces, it will be appreciated that the chamfering may be of less extent if desired and have the effect of reducing the area of contact without producing line contact.

In the assembly connecting link plates 11 which are provided with openings 20 adjacent their ends are slipped over the pins 14 and the ends of the pins are riveted or upset as indicated at 21 to retain the parts in assembled relation. This operation may conveniently be carried out by cold shearing in circular form so as to cut an annular portion of metal from the ends of the pins and form it outwardly as illustrated.

The feature of construction of the present invention which contributes primarily to the simplicity and economy of production is the formation of the tubular sleeves or collars 13 on the link bars 12. In the manufacture of the link bars a flat piece of metal having the outline of the link bar is pierced and the metal surrounding the openings is formed laterally of the plate to provide the integral tubular sleeves or collars. By this arrangement the number of component parts necessary to make up the chain is reduced and pairs of link bars when assembled together to form a link provide the integral journal for the reception of the pins 14 and the rollers 15.

The method of forming the link bars produces a fillet of small radius which is indicated in Figure 2 at 23. It will be observed that the chamfer 17, in addition to reducing the area of contact between the ends of the rollers 15 and the inner surface of the link bars 12, also provides clearance for the fillet. This avoids the necessity of removal of the fillet 23 of the link bars by an additional machining operation without reducing the efficiency of the assembled product.

Means are provided for breaking the chain. The construction necessary to accomplish this comprises providing the circular end surfaces 25 of the link bars eccentric with respect to the opening 26 provided in the tubular sleeves or collars 13, this eccentricity being indicated by the numeral 28 in Figure 1. At the same time, certain of the connector plates 11 are provided with pin receiving openings 27 which are somewhat larger than the pins 14, and in fact which are of sufficient size to permit removal of the connector plates over the outwardly extending rivet portion 21 when the opening 27 is centered with respect to the pin 14. Normally centering of the opening 27 with respect to the pin 14 is prevented by the proximity of the ends 25 of adjacent links. Due to the eccentricity of the circular end surface 25 with respect to the axis of the pins in the assembled chain, a pair of links 10 may be bent at right angles with respect to each other, at which time connecter plates 11 may be removed to break the chain, and additional links inserted or removed to lengthen or shorten the chain.

Referring now to Figure 3, there is illustrated somewhat different means for reducing the area of contact between the ends of rollers 30 and the inner surfaces of link bars 31 and 32. In this case instead of chamfering the ends of the roller 30, link bars 31 and 32 are provided with indentations 33 which may be in the form of spot indentations or may be circular extending symmetrically about the axis of the collars 34. Indentations 33 may be formed in the link bars in the same operation in which the collars 34 are formed. Link bars 31 and 32 are assembled together with a pin 35 which is identical with the pin 14 previously described and links are interconnected by plates 36 which are identical with the plates 11 previously described.

The drawings and the foregoing specification constitute a description of the improved chain structure in such full, clear, concise and exact terms as to enable any person skilled in the art to practice the invention, the scope of which is indicated by the appended claims.

What we claim as our invention is:

1. A sprocket chain of the class described comprising links each of which includes a pair of identical link bars having integral inwardly extending sleeves or collars at opposite ends of the link bars, the ends of said sleeves or collars abutting to define a roller supporting, pin receiving journal, a roller on said journal, the ends of said roller being chamfered to reduce the area of contact between the ends of said roller and the inner surface of said link bars, pins extending through said journal, and link plates connecting adjacent links together, said link plates having openings adjacent their ends for receiving the projecting ends of said pins.

2. A sprocket chain comprising pivotally connected links each of which comprises a pair of identical link bars of flat stock having laterally projecting integral collars formed outwardly therefrom, the ends of said collars abutting in assembly, the intersection of the outer surface of said collars and the inner surface of said bars forming a fillet, and rollers surrounding said collars, the ends of said rollers engaging the inner surfaces of said link bars and being relieved on the inner corners to provide clearance for said fillets.

3. A sprocket chain comprising links each of which comprises a pair of identical link bars, the ends of which are formed on circular arcs, integrally formed tubular collars adjacent the end of each link bar, the axes of said collars being spaced inwardly from the centers of curvature of the ends of said link bars, pins extending through said collars, rivet ends on said pins, and connecting link plates having enlarged openings receiving the projecting ends of said pins, the curved ends of adjacent link bars being in proximity when adjacent links are aligned, but spaced when adjacent links are angularly related to permit removal of said connecting plates.

4. As a new article of manufacture for use in assembling sprocket chains, a link bar formed of flat stock having tubular sleeves or collars formed outwardly from the flat stock adjacent the ends of said link bar, the ends of said link bar being formed on a circular arc whose center is outwardly from the axis of the adjacent collar.

5. A sprocket chain comprising links each of which comprises spaced link bars and pin receiving, roller supporting journals between said bars adjacent their ends, and rollers on said journals, the ends of said rollers being in engagement with the inner surfaces of said link bars and being shaped to reduce the area of contact with the inner surface of said link bars.

6. A sprocket chain comprising links formed of identical link bars having tubular collars extending laterally therefrom adjacent the ends thereof, the ends of said collars abutting to form spacers between said link bars, cylindrical rollers surrounding said collars, pins extending through said collars, and connecting link plates pivotally secured adjacent their ends to the projecting ends of said pins, the inner surfaces of the link bars adjacent said tubular collars having inwardly projecting portions adapted to engage the adjacent ends of the rollers to reduce the area of contact between the ends of the rollers and the inner surfaces of the link bars.

7. As a new article of manufacture for use in assembling sprocket chains, a link bar formed of flat stock having tubular sleeves or collars formed outwardly from the flat stock adjacent the ends of said link bar, and projecting portions of relatively small area extending from the link bar in the same direction as the sleeves or collars and spaced uniformly around said sleeves or collars.

8. As a new article of manufacture for use in assembling sprocket chains, a link bar formed of flat stock having tubular sleeves or collars formed outwardly from the flat stock adjacent the ends of said link bar, the material of said bar being formed to provide bearing portions extending from the flat stock of the link bar in the same direction as the sleeves or collars surrounding said sleeves or collars and uniformly spaced radially outwardly therefrom.

DONALD J. McINTOSH.
MITCHELL SMITH.

REFERENCES CITED

The following references are of record in the file of this patent:

UNITED STATES PATENTS

| Number | Name | Date |
|---|---|---|
| Re. 22,488 | Focke | May 30, 1944 |
| 639,575 | Holmes | Dec. 19, 1899 |
| 1,146,905 | Stark | July 20, 1915 |
| 1,421,178 | Davis | June 27, 1922 |